Sept. 21, 1926.
W. C. ANTHONY
1,600,614
DUMPING BODY
Filed Dec. 24, 1925
4 Sheets-Sheet 1
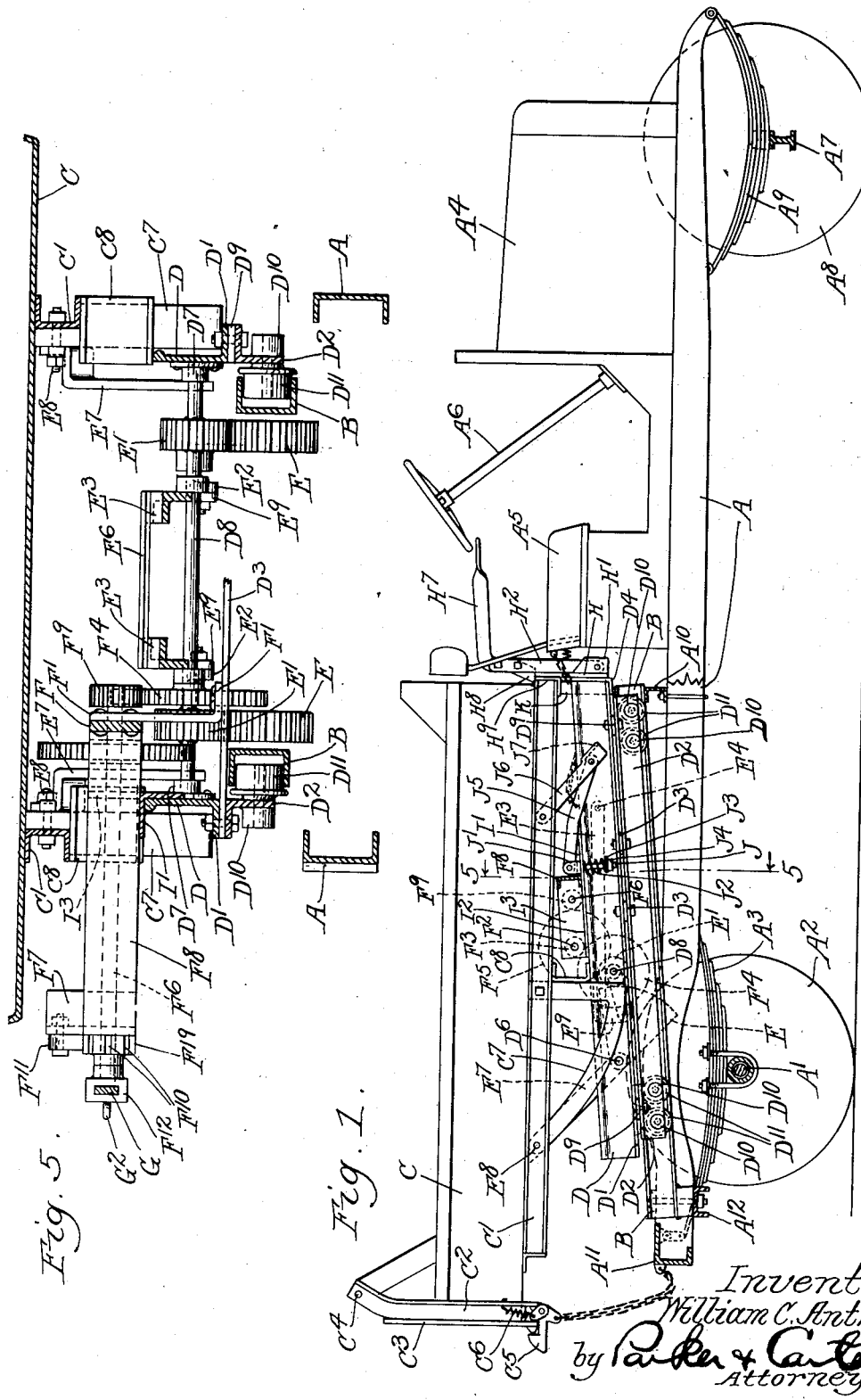

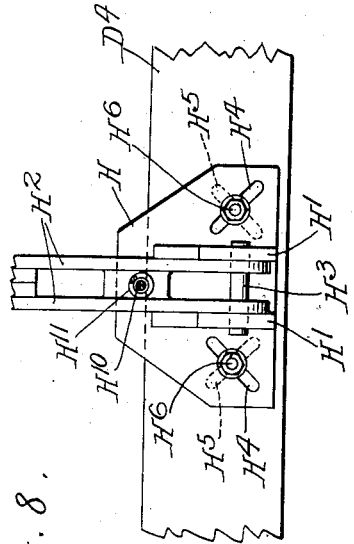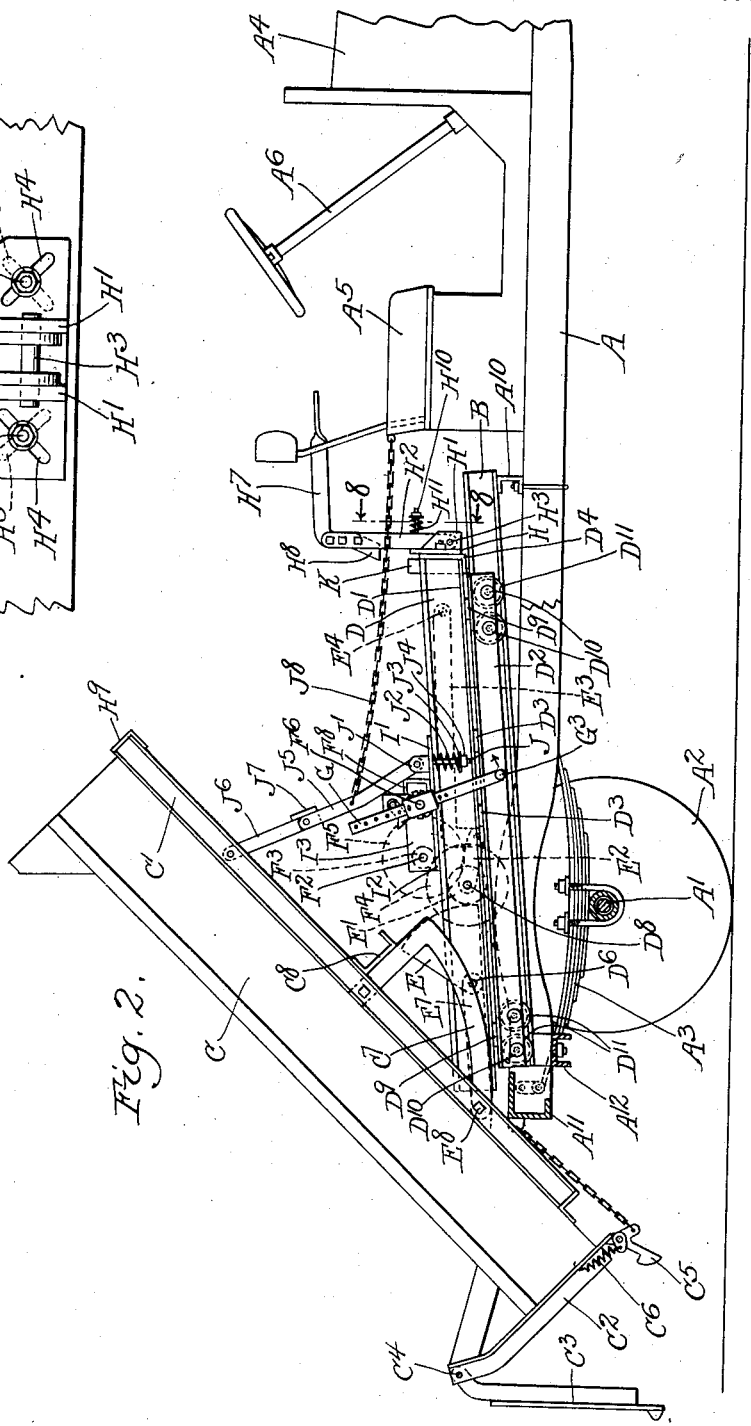

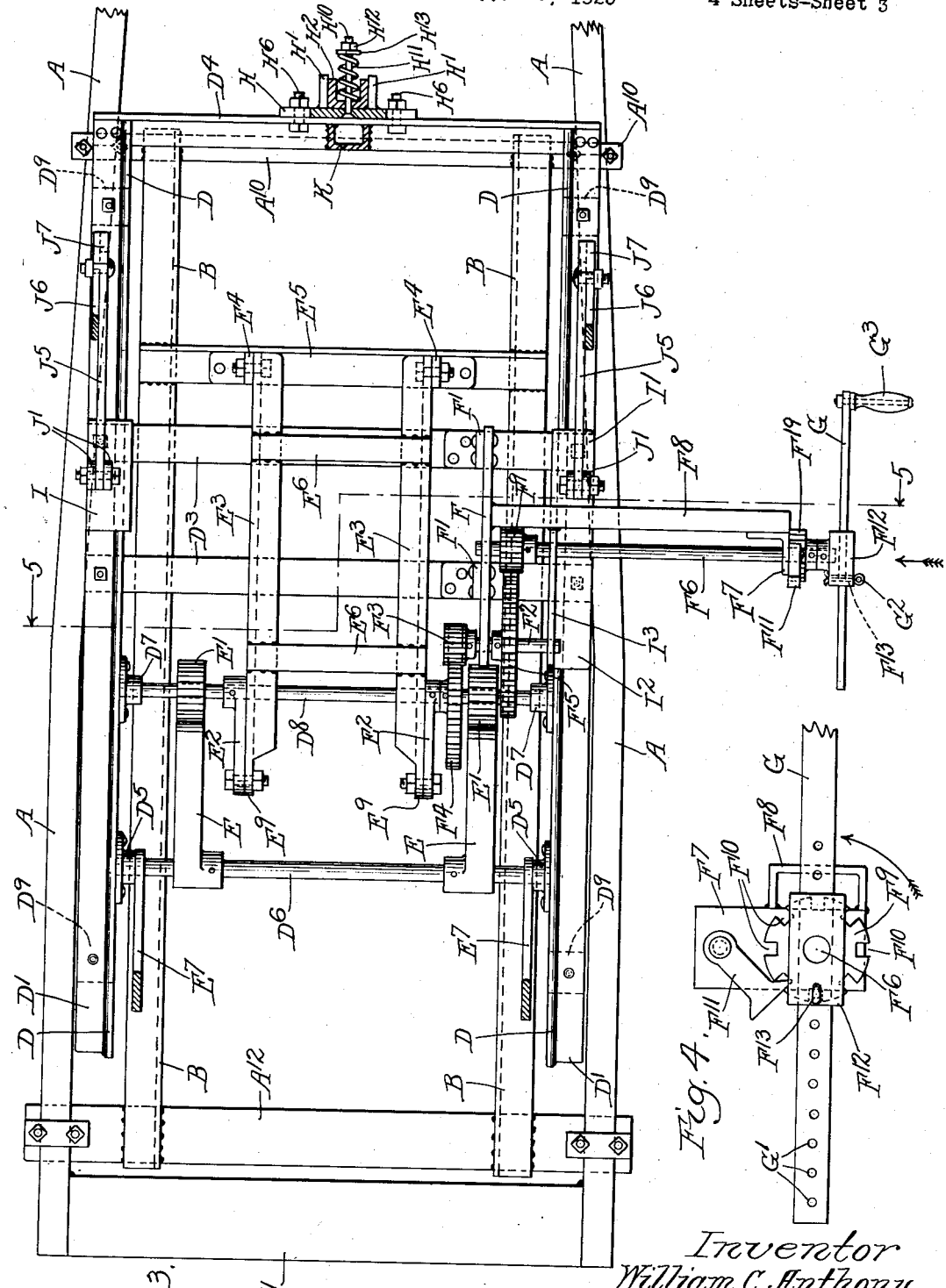

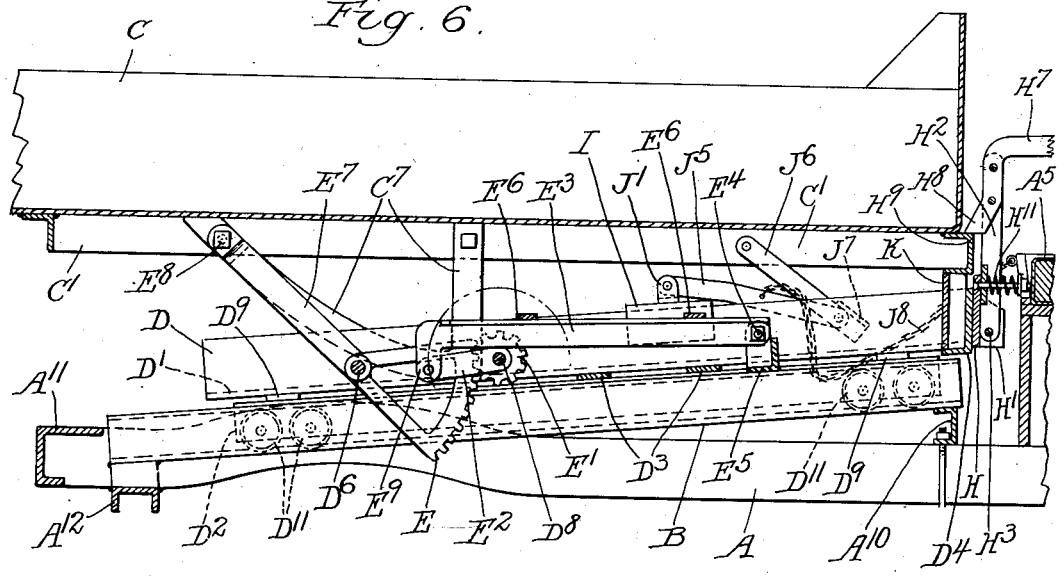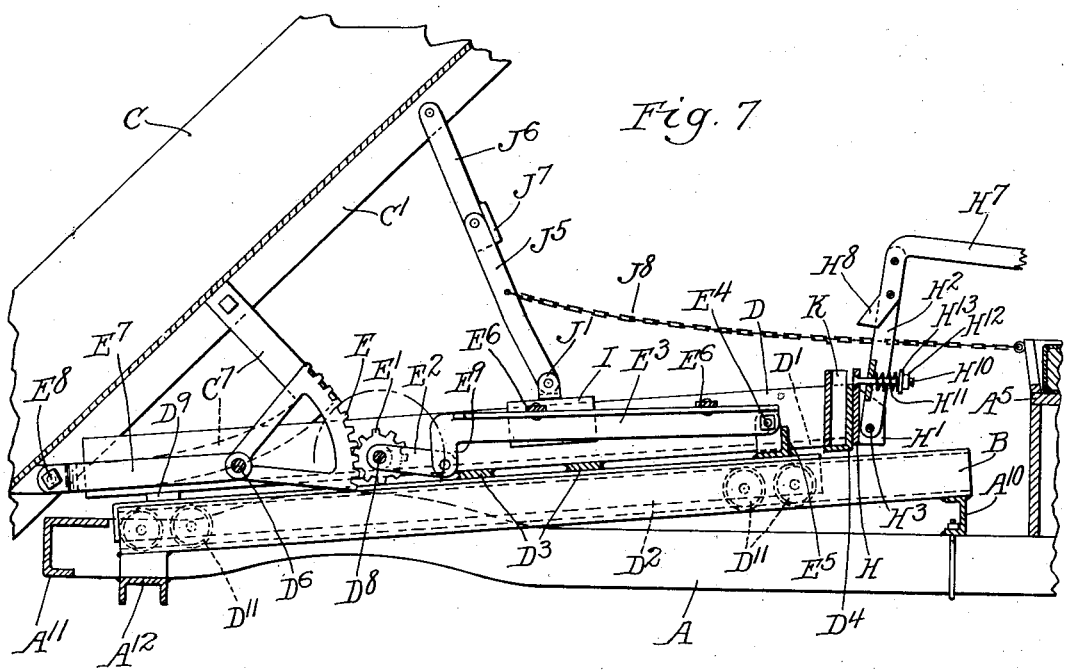

Patented Sept. 21, 1926.

1,600,614

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

DUMPING BODY.

Application filed December 24, 1925. Serial No. 77,459.

This invention relates to a material holding container in combination with an apparatus for tipping the same to dump its contents. In the form illustrated herewith it is combined with an automotive vehicle, but it is not limited to a combination with a vehicle.

It has for one object to provide means whereby the body or container may be normally held against tipping and when free to tip will do so without the use of any outside power, and in tipping will operate means to move itself bodily. Another object of the invention is to provide a mechanism which will be operated by the body when it tips and which will move the body from its original point of support a distance greater than that caused by the rocking of the body on its support alone. Other objects will appear from time to time throughout the specification and claims.

My invention is illustrated diagrammatically in the accompanying drawings, wherein:—

Figure 1 is a side elevation of the body in the loading or filling position, with parts broken away;

Figure 2 is a similar view showing the body tipped;

Figure 3 is a plan view with parts in section on an enlarged scale, of the body moving mechanism;

Figure 4 is a detail of a portion of the return mechanism looking in the direction of the arrow in Figure 3;

Figure 5 is a section taken on line 5—5 of Figure 1 or 3 on an enlarged scale;

Figure 6 is a fore and aft section on an enlarged scale showing in detail a portion of the tipping and body moving mechanism when in the untipped position;

Figure 7 is a similar view showing the parts when the body has moved to the tipped position.

Figure 8 is a detail section taken on line 8—8 of Figure 2.

Like parts are indicated by like characters throughout.

A is the frame of a vehicle. $A^1$ is a rear axle supported from the ground by a pair of wheels $A^2$. Supporting the vehicle frame from the axle are springs $A^3$. $A^4$ is an engine compartment. $A^5$ is a driver's seat and $A^6$ a steering column. $A^7$ is a front axle supported from the ground by wheels $A^8$. The vehicle frame at its forward end is supported from the axle $A^7$ by springs $A^9$. The details of the vehicle will not be set out fully as they form no particular part of the present invention. The dumping body mechanism therefore might be mounted on a vehicle of any type, automotive or horse or hand drawn, or it might be supported from a stationary mounting. $A^{10}$ is a cross member extending across the vehicle frame intermediate its ends. $A^{11}$ is a rear cross member at the end of the vehicle frame. $A^{12}$ is a sub-frame cross member extending across between the two side members of the frame and located slightly in front of the cross member $A^{11}$.

B B are sub-frame side members supported at their forward ends on the cross member $A^{10}$ and at their rearward ends on the cross member $A^{12}$. The members B are formed with a channel section as shown in detail in Figure 5.

C is a dumping body provided with the frame and strengthening members $C^1$, on which it is mounted. It is provided also with suitable gate mechanism including a gate frame $C^2$ and gate $C^3$ pivoted at $C^4$ and provided with a pivoted latch $C^5$ by means of which it is held closed. The latch $C^5$ is normally held in the closed position by the spring $C^6$. Extending downwardly from the body is a pair of curved rockers $C^7$ which are braced and strenghened by short channel members $C^8$ $C^8$ secured to the frame $C^1$ which rest on the members D when in the loading position of the body and help support the load.

Movably mounted on the sub-frame members B B is a dolly formed of side members D having at their lower edges a laterally extended flange $D^1$. Fastened to the bottom of the flange $D^1$ and extending downwardly along the track members B on either side of the dolly is an angle member $D^2$. Extending across the dolly and lying between the flange $D^1$ and the angle member $D^2$ is a pair of cross members $D^3 D^3$. At the forward end of the dolly is a cross member $D^4$. Extending across the dolly and journaled in bearings $D^5$ on the members $D$ is a shaft $D^6$. Extending across the dolly between the members $D$ and journaled in bearings $D^7$ on the members $D$ is a somewhat lighter shaft $D^8$. Adjacent the forward and rear ends of the dolly at each side is a spacer block $D^9$ which lies between the flange $D^1$ and the upper surface of the angle member $D^2$. $D^{10} D^{10}$ are bearings mounted preferably on the outside of the angle members $D^2$ and supporting flanged rollers $D^{11}$ which roll in the track members B and by means of which the dolly above described may be moved longitudinally along the track members.

E E are geared segments mounted on the shaft $D^6$. $E^1 E^1$ are pinions mounted on the shaft $D^8$ and meshing with the segments E. $E^2 E^2$ are crank arms mounted on the shaft $D^8$. Each of these crank arms is pivoted at its outer end to one of the side members $E^3$ with a composite linkage, each of which is pivoted at $E^4$ on a cross member $E^5$ of the sub-frame of the vehicle, which cross member is attached at each end to the track B. $E^6 E^6$ are bracing joined at each end to the members $E^3$. $E^7 E^7$ are crank arms each of which is fixedly mounted at one end on the shaft $D^6$ and pivotally mounted at the other to a bearing $E^8$ on the frame $C^1$ of the dumping body C. The members $E^3$ are formed as shown particularly in Figures 6 and 7 with downwardly depending nose portions $E^9$, and it is these portions $E^9$ which are joined to the crank arms $E^2$.

F is a frame member mounted at $F^1 F^1$ upon the cross members $D^3$. Pivoted at one end in the frame F and at the other in the adjacent side member D of the dolly is a stub shaft $F^2$ which carries at its inner end a pinion $F^3$ which meshes with a gear $F^4$ on a shaft $D^8$. Adjacent its outer end the shaft $F^2$ carries a second gear $F^5$. $F^6$ is a crank shaft journaled at one end in a frame member F and at the other supported in a bearing block $F^7$ carried at the outer end of the extension arm $F^8$. This shaft carries adjacent its inner end a pinion $F^9$ which meshes with a gear $F^5$. Fixed adjacent the outer end of the shaft $F^6$ is a ratchet wheel $F^{19}$, provided with generally square notches $F^{10}$. Pivotally mounted on the bearing block $F^7$ is a dog $F^{11}$. Fixed at the outer end of the shaft $F^6$ is a block $F^{12}$ through which a crank handle G may slide. This handle is provided with a plurality of perforations $G^1$, and the block $F^{12}$ is provided with a perforation $F^{13}$. One of the perforations $G^1$ of the member G may be brought into line with the perforation $F^{13}$ and a cotter-pin or other holding device $G^2$ may be inserted. By this means the effective length of the crank handle G may be adjusted to suit the requirements of the device. $G^3$ is a swiveled handle mounted at one end of the crank G.

H is an attaching plate provided with a pair of outwardly bent ears $H^1$ between which the locking handle $H^2$ is pivoted as at $H^3$. Formed in the plate H are a pair of inclined slots $H^4$. Situated generally opposite these slots are a pair of oppositely inclined slots $H^5$ which are made or otherwise formed in the cross member $D^4$. By means of these pairs of inclined slots the position of the plate H on the member $D^4$ may be varied and adjusted. The plate is held in suitable position by means of bolts $H^6$ which pass through both slots. The upper end of the locking handle $H^2$ is provided with laterally bent extensions $H^7$ which serve as a handle by means of which it may be manipulated to lock or free the body. $H^8$ is a locking nose on the handle $H^2$ adapted when the body is in the locked position to engage a portion $H^9$ of the body frame $C^1$. $H^{10}$ is a bolt positioned preferably in the upper part of the plate H and extending loosely through a perforation in the handle $H^2$. About it is a helical spring $H^{11}$ and at its end it carries a nut $H^{12}$ and washer $H^{13}$ by means of which the spring may be held in place and its tension adjusted. The function of the spring is to hold the locking handle normally in the locking position so that it either holds the body when the body is in the normal upright position, or else is held in the position of readiness to engage the body as soon as it is returned to the upright position.

I is an attaching plate mounted on the member D, and $I^1$ is a generally similar plate mounted on the opposite member D. It is, however, provided with a rearward elongation $I^2$ which has an up-standing web or flange $I^3$, this portion of the member serving to support and carry the shafts $F^2$ and $F^6$.

J is a bolt extending through the member I, provided at its upper end with a pair of ears $J^1$. About the bolt is a helical spring $J^2$. At the lower end of the bolt is a washer $J^3$ and a nut $J^4$ which serves to confine the spring. Pivoted in the ears $J^1$ is a bent branch $J^5$ of a body support. Pivoted to the body frame $C^1$ at one end and joined to the upper end of bent support member $J^5$ at its other end is a second support member $J^6$. $J^7$ is a plate adapted to limit the relative movement of the parts $J^6$ and $J^5$ in one direction. $J^8$ is a chain fastened to the member $J^5$ and extending forward, preferably to the driver's seat. When the body is in the normal carrying or upright position the supporting member is in the position shown particularly in Figure 6. When the body is tipped, this member automatically moves into the supporting position shown in Figure 7, and in that position it supports the body and prevents its return movement. When it is desired to have the body return, the chain is pulled and the joined supporting member is broken from its upright position and the body is then free to return.

Although I have shown an operative device, still it will be obvious that many changes might be made in size, shape and arrangement of parts without departing materially from the spirit of my invention; and I wish, therefore, that my showing be taken as in a sense diagrammatic.

The use and operation of my invention are as follows:

The body and sub-frame are mounted on any suitable vehicle. When the body is to be loaded, it will be brought into the position shown in Figures 1 and 6. In that position it is held against tilting or rolling movement and may be loaded. When it is desired to dump the body the handle H⁷ is pressed downward and the nose H⁸ is drawn out of contact with the body frame and the body is free to tilt. It is of such shape and its balance is so related to the point of support that the body will normally tip to the rear automatically. As it does this the links E⁷ rotate the shaft D⁶ which rotates the gear segments E in mesh with the gears E¹, thus rotating the shaft D⁸ in such direction that the crank arms E² are raised from the horizontal position which they occupy as shown in Figures 1 and 6. As they are rotated upward, they bear against the members E³ and since the pivotal point of those members at E⁴ is fixed with relation to the vehicle frame, movement in the forward direction is impossible and movement in the rearward direction is possible, and the dolly carrying the track and the body upon it is pushed bodily rearward as the dumping movement of the body C occurs.

Thus as the body tilts it operates a mechanism which moves it longitudinally and rearwardly a distance greater than the normal rearward movement which it would have if it tilted only. That is to say its movement rearwardly is a distance greater than the projection on the track of the rockers C⁷. As this tipping movement takes place the support composed generally of the members J⁵ and J⁶ moves into the supporting position, and finally snaps into the position shown in Figure 2 in which it holds the body against return movement. As there is some shock and jar on this member, the spring J² has been provided and this permits the bolt J to be pulled slightly upward and thus the final snap or shock due to the completion of the tilting of the body is received on and cushioned by the spring J², and the body supporting member thus serves both as a means for checking and cushioning the final tilting movement of the body and also as a means for holding the body against return movement to the upright or filling position.

When it is desired to return the body to the upright position, the chain is drawn in and the supporting member is bent or "broken" and the body is then free to return. I have shown in the drawings two supporting members, one might be used but for some purposes two are desirable, and usually the two will be controlled by one chain.

Under some circumstances as soon as the body is free to move by the "break" of the support member or members, it will return of its own weight. This will not always take place and for this reason the gearing and crank arrangement shown has been provided, and thus if the body does not return as soon as it is free to do so, the operator will rotate the crank, moving the holding dog F¹¹ so that rotation will be permitted in the direction desired. Since the crank handle fitting F¹² is fixed on the shaft F⁶ at all times, the handle when rotated will rotate the body moving mechanism. It may be used to tip or raise the body, and it is necessary to move the controlling dog F¹¹ into position to permit rotation of the parts in the desired direction.

For some purposes it is desired to tilt the body a distance less than this full limit of tilt, and this is preferably done by hand. For this purpose the operator moves the controlling dog F¹¹ into position to permit the rotation of the crank so as to cause the body to be tilted. He then frees the body by operating the handle H⁷ and rotates the crank to tip the body to the desired point. Then he moves the dog F¹¹ to prevent further rotation in this direction, and since the weight of the body normally tends to tip it to its full tipping position, when the dog has been moved to prevent further rotation in the tipping direction, the body will be held of its own weight in that position. Thus the dog and its associated mechanism serves to control the direction of rotation of the raising handle and also to lock the body in position intermediate its extreme limits.

I claim:—

1. In combination with a support, a load carrying member having a supporting part supported from such support and carrying the load carrying member and adapted of itself to cause the load carrying member to tip, and means operated by such tipping alone and adapted to move the load carrying member longitudinally in response to such tipping bodily a distance greater than that normally incident to the tipping alone.

2. In combination with a support, a load carrying member having a supporting part supported from such support and carrying the load carrying member, and adapted of itself to cause the load carrying member to tip, and means for moving such supporting member bodily longitudinally in response to such tipping a distance greater than that normally incident to such tipping alone.

3. In combination a track, a body having a supporting rocker supporting such body from such track, and adapted to tip the body, and means for moving such rocker bodily longitudinally in response to such tipping a distance greater than that normally incident to such tipping alone.

4. In combination with a support, a load carrying member supported therefrom, means for holding said load-carrying member against tipping, said member adapted automatically to tip with relation thereto when free for tipping, means for releasing such holding means to free the body for tipping, and means for moving said member bodily longitudinally a distance greater than that normally incident to such tipping alone.

5. In combination with a support, a load carrying member supported therefrom and adapted automatically to tip with relation thereto when free for tipping, and means for moving said member bodily longitudinally when it tips a distance greater than that normally incident to such tipping alone.

6. In combination with a support, a load carrying member supported therefrom and adapted automatically to tip with relation thereto when free for tipping, and means for moving said member bodily longitudinally when it tips, and in response to such tipping, a distance greater than that normally incident to such tipping alone.

7. In combination with a support, a body mounted thereon and adapted to tip with relation thereto, a rocker for the body, supporting the same from the vehicle, and means for moving the body bodily longitudinally as it tips a distance greater than the projection of its rocker upon the vehicle frame.

8. In combination with a support, a body mounted thereon and adapted to tip with relation thereto, a rocker for the body, supporting the same from the vehicle, and means for moving the body bodily longitudinally as it tips, and in response to such tipping, a distance greater than the projection of its rocker upon the vehicle frame.

9. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and the sub-frames, and means for moving such second sub-frame to the rear.

10. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and the sub-frames, and means for moving such second sub-frame to the rear in response to the tipping movement.

11. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and the sub-frames, and means for moving such second sub-frame to the rear during the tipping operation.

12. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and sub-frames, and means for moving such second sub-frame to the rear during the tipping movement of the body.

13. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and the sub-frames, and means for moving such second sub-frame to the rear, and manually operated and controlled means for returning the body and the movable frame to their original position.

14. In combination with a vehicle body, a vehicle frame, a sub-frame mounted on said vehicle frame, and a second sub-frame movably supported from such sub-frame, a body supported from such second frame, supports carrying such body and adapted, when the body is free to move, to tip the same with relation to the vehicle frame and sub-frames, and means for moving such second sub-frame to the rear during the tipping movement of the body, and manually operated and controlled means for returning the body and the movable frame to their original position.

15. In combination with a vehicle body, a vehicle frame, a sub-frame fixedly mounted thereon, and a second frame movably supported from such fixed sub-frame, a body supported from such second frame, cams supporting such body and resting upon such second frame and adapted, when the body is free to move, to tip the same with relation to the vehicle frame and the sub-frames, and means for moving such second sub-frame to the rear during the tipping movement of the body, such means operated in response to such tipping movement, and manually operated and controlled means for returning the body and the movable frame to their original position.

Signed at Streator, county of La Salle and State of Illinois, this 19th day of December 1925.

WILLIAM C. ANTHONY.